(12) United States Patent
Ji et al.

(10) Patent No.: US 12,152,514 B2
(45) Date of Patent: Nov. 26, 2024

(54) VARIABLE VALVE ACTUATION DEVICE FOR ENGINE

(71) Applicant: Suzhou Sanlin Valteng Automobile Technology Co., Ltd., Suzhou (CN)

(72) Inventors: Tengfei Ji, Suzhou (CN); Dongri Jin, Suzhou (CN); Hongqiang Yu, Suzhou (CN); Wei Shi, Suzhou (CN); Jian Song, Suzhou (CN)

(73) Assignee: Suzhou Sanlin Valteng Automobile Technology Co., Ltd., Suzhou (CN)

( * ) Notice: Subject to any disclaimer, the term of this patent is extended or adjusted under 35 U.S.C. 154(b) by 0 days.

(21) Appl. No.: 18/631,482

(22) Filed: Apr. 10, 2024

(65) Prior Publication Data

US 2024/0344468 A1 Oct. 17, 2024

(30) Foreign Application Priority Data

Apr. 13, 2023 (CN) .......................... 202310394295.4

(51) Int. Cl.
  *F01L 13/00* (2006.01)
  *F01L 1/18* (2006.01)
  (Continued)

(52) U.S. Cl.
  CPC ........... *F01L 13/0036* (2013.01); *F01L 1/181* (2013.01); *F01L 1/46* (2013.01); *F01L 1/053* (2013.01);
  (Continued)

(58) Field of Classification Search
  CPC ... F01L 1/053; F01L 1/181; F01L 1/46; F01L 13/0036; F01L 2305/02; F01L 2820/034
  (Continued)

(56) References Cited

U.S. PATENT DOCUMENTS

2012/0325168 A1\* 12/2012 Nitz ..................... F01L 13/0036
                                                        123/90.17
2017/0159515 A1\* 6/2017 Okamoto ................ F01L 1/267
(Continued)

FOREIGN PATENT DOCUMENTS

CN         110080849 A      8/2019
DE      102016015459 A1 \*  6/2018
WO     WO-2020233508 A1 \*  11/2020  .............. F01L 1/047

OTHER PUBLICATIONS

DE102016015459A1 (Year: 2018).\*

*Primary Examiner* — Jorge L Leon, Jr.
(74) *Attorney, Agent, or Firm* — Westbridge IP LLC (57) ABSTRACT

A variable valve actuation device for an engine includes a rocker arm mechanism, a camshaft, an actuation mechanism and a blocking mechanism. The rocker arm roller can slide on a roller shaft so as to have two operating positions, a first cam and a second cam which are adjacent are provided on the camshaft, the rocker arm mechanism is actuated, based on the different operating positions of the rocker arm roller, by the first cam or the second cam, respectively, to enable the engine to have two valve lifts, a control cam is further provided on one side of the first cam or the second cam, the control cam can actuate the blocking mechanism, and the rocker arm roller is blocked from switching in a switching prohibited portion of the first cam and the second cam, and is allowed to switching in a non-switching prohibited portion.

7 Claims, 11 Drawing Sheets (51) Int. Cl.
  *F01L 1/46*  (2006.01)
  *F01L 1/053*  (2006.01)
(52) U.S. Cl.
  CPC ..... *F01L 2305/02* (2020.05); *F01L 2820/034* (2013.01)
(58) Field of Classification Search
  USPC ............... 123/90.16, 90.21, 90.27, 90.44
  See application file for complete search history.

(56) References Cited

U.S. PATENT DOCUMENTS

2019/0072012 A1\* 3/2019 Yang ................. F01L 1/181
2020/0291830 A1\* 9/2020 Altherr ................. F01L 13/06
2020/0308997 A1\* 10/2020 Altherr ................. F01L 1/267

\* cited by examiner

VARIABLE VALVE ACTUATION DEVICE FOR ENGINE

CROSS-REFERENCE TO RELATED APPLICATIONS

This application claims priority to Chinese Patent Application No. 202310394295.4, filed on Apr. 13, 2023, the content of which is incorporated herein by reference in its entirety.

TECHNICAL FIELD

The present application relates to the technical field of engines, in particular, to a variable valve actuation device for an engine.

BACKGROUND

At present, there are many kinds of known variable valve technologies for engines, various variable valve technologies realize the variability of lift or timing of valve through different structural designs and control methods, to enable the engine to achieve better performance or some special functions. One of the known variable valve technologies is that the engine can obtain two different valve lifts to improve the performance of the engine or realize certain special functions such as an engine braking function, by providing two cams with different profiles on a camshaft of the engine and switching a valve actuation device between two different cams as required.

Disclosed in Chinese Patent Application Publication No. CN110080849A is a camshaft and a valve actuation device for an engine. According to the specification of the disclosure, the device includes a camshaft, a rocker arm mechanism and a control mechanism, two adjacent cams are provided on the camshaft of the device for a rocker arm, the two cams have different profiles and have a segment B where the two cams both are in base circle parts thereof, the control mechanism in the device includes an actuator, and the actuator pushes the rocker arm roller to switch from one cam to the other cam through a roller shift fork, so as to form a variable valve. For such a variable valve device for switching operating positions of the rocker arm roller, during the switching of the rocker arm roller, the contacts of the rocker arm roller with different cams can be reliably switched only by ensuring that the two cams are in base circle parts thereof, and if the switching is performed when any cam is not in the base circle part, the switching can be failed or a valve system damage will be caused by a sudden change of valve lift. The design scheme of the patent successfully avoids the switching of the roller in the lift portion by providing a flange between the portions of the two cams with the lifts to block the roller from switching, and only the portion (segment B) where the two cams both are in base circle parts thereof is reserved without the flange, in which the rocker arm roller can be switched.

Figure 1:
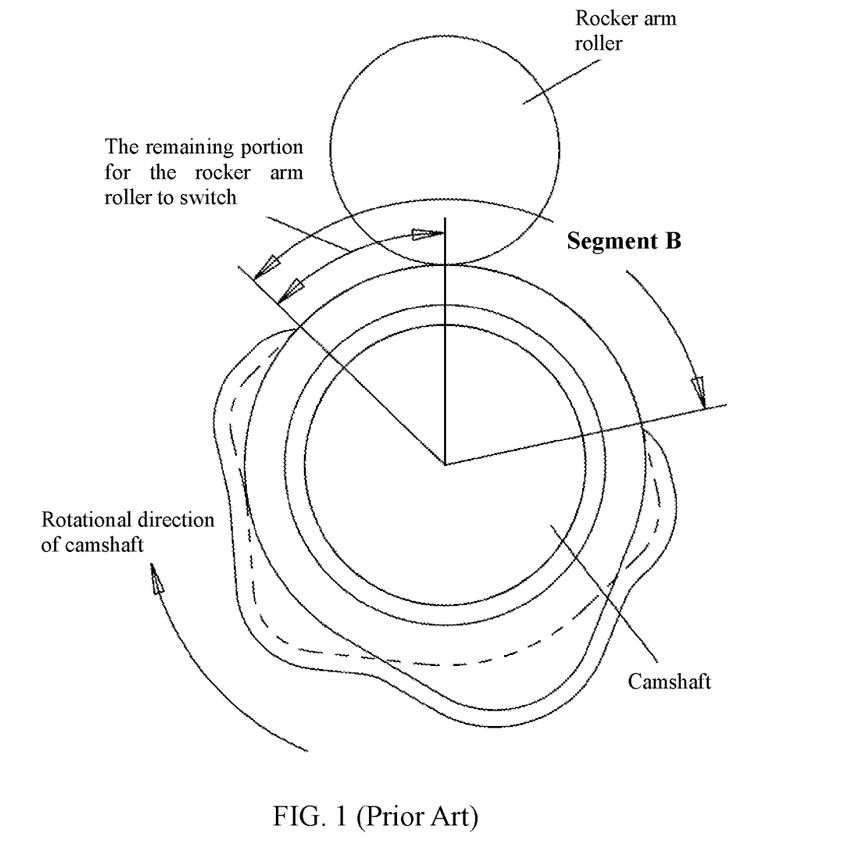
FIG. 1 is a schematic diagram where a camshaft as described in the background of the present application rotates to a point that the rocker arm roller has passed through a larger portion of the segment B.

However, the variable valve actuation device disclosed in CN110080849A also has obvious disadvantages: when the engine runs at high speed, the rotational speed of the camshaft is high, the time for the rocker arm roller to pass through the segment B where the two cams both are in base circle parts thereof is short, the rocker arm roller can have the maximum switching time only if the rocker arm roller starts to switch once the segment B reaches the roller position, and if the roller starts to switch when the camshaft rotates to a point that the rocker arm roller has passed through a larger portion of the segment B (as shown in FIG. 1) (at this time, the remaining portion of the segment B for the roller to switch is small), the rocker arm roller cannot be switched to the other cam completely because the remaining switching time is too short, such that the rocker arm roller rides on the flange causing damage to the rocker arm mechanism. It is also mentioned in the specification of CN110080849A that the control mechanism of the device requires the Electronic Control Unit (ECU) for the engine to determine an angular position of the cam at this time according to a cam position sensor, and a solenoid valve is energized when the camshaft rotates to the point that the rocker arm roller has just entered or is about to enter the segment B where the two cams both are in base circle parts thereof, so that the position of the rocker arm roller when the rocker arm roller starts to act is controlled, to ensure the maximum switching time of the rocker arm roller.

In practical application, a connecting pipeline from the solenoid valve to the actuator is needed. When the solenoid valve is energized, the actuator does not act immediately. The actuator needs to wait until the pressure in the pipeline exceeds the spring force to actuate the rocker arm roller to start to switch, which needs a time, namely, the actuator response time. Therefore, in order to control the rocker arm roller to start to switch once the rocker arm roller enters the segment B, a certain advance is needed to be set for the energization time of a solenoid valve. Similarly, when the solenoid valve is deenergized, the action of returning the rocker arm roller by the spring force also has a response time. The actuator needs to wait until the pressure in the pipeline is lower than the spring force to actuate the rocker arm roller to start to return. The response time of the actuator can change when the length, the flow section and the internal volume of the connecting pipeline change. Also, the solenoid valve itself has a response time, and the response time of the solenoid valve can also change when there are differences in the consistency of parts. When the camshaft runs at a high speed, the time for the rocker arm roller to pass through the segment B is very short (sometimes only tens of milliseconds). The position of the rocker arm roller when the rocker arm roller starts to switch can be influenced by a small change in the response time of the actuator and the solenoid valve. In addition, the change in response time can be raised by a change in working pressure and temperature as well as the consistency of parts of the actuator. Therefore, when products are produced in batches, it is difficult to control the consistency of products because of the above change in response time, and it is inevitable that there will be products of which the rocker arm roller cannot start to switch at the designed position due to the large change in response time or extreme usage environment, resulting in a failure of the rocker arm mechanism. Secondly, when the camshaft position sensor fails, an error position signal may be transmitted to the ECU, which may cause the ECU to energize the solenoid valve at a wrong time, resulting in a switching failure. In addition, because the ECU of the engine determines the time for energizing the solenoid valve according to the camshaft position signal, the camshaft rotating angles generated in the same response time are different under different rotational speeds, which requires the ECU to energize the solenoid valve according to different camshaft position signals under different rotational speeds of the engine, and requires the software of the ECU to add corresponding control logic which makes the software system of the ECU more complex.

SUMMARY

In order to solve the defects in the prior art, the present application provides a variable valve actuation device for an engine.

The variable valve actuation device for the engine includes a rocker arm mechanism, a camshaft, an actuation mechanism and a blocking mechanism, where the rocker arm mechanism is provided with a rocker arm roller, the rocker arm roller is rotatably installed on a roller shaft, the rocker arm mechanism is provided with a widened roller mounting space, and the rocker arm roller can slide left and right on the roller shaft to enable the rocker arm roller to have a first operating position and a second operating position.

A first cam and a second cam which are adjacent are provided on the camshaft, the position of the first cam corresponds to the first operating position of the rocker arm roller, the position of the second cam corresponds to the second operating position of the rocker arm roller, the rocker arm mechanism is actuated, based on the different operating positions of the rocker arm roller, by the first cam or the second cam, respectively, the first cam and the second cam have a same diameter in base circle parts thereof and have a segment B in a circumferential direction where the two cams both are in base circle parts thereof, and a control cam is further provided on one side of the first cam or the second cam.

The actuation mechanism includes a actuation cylinder, the actuation cylinder is a small cylinder actuated by compressed air, a actuating piston is installed in a cylinder hole of the actuation cylinder, a roller shift fork is installed on a piston rod of the actuating piston, the rocker arm roller is held by the roller shift fork, and the actuation cylinder actuates the rocker arm roller to switch between the first operating position and the second operating position through the roller shift fork installed on the piston rod.

The blocking mechanism includes a blocking rod and a blocking rod shaft, the blocking rod shaft is installed on the actuation cylinder, the blocking rod is rotatably installed on the blocking rod shaft, one end of the blocking rod is in contact with the control cam of the camshaft and is actuated by the control cam to swing, the blocking rod is in contact with or out of contact with the roller shift fork by the swinging, when the blocking rod is in contact with the roller shift fork, the blocking rod blocks the roller shift fork from moving, and when the blocking rod is out of contact with the roller shift fork, the roller shift fork can drive the rocker arm roller to move under an action of the actuation cylinder.

Further, the one end of the blocking rod is positioned close to the roller shift fork, the roller shift fork is provided with one protrusion, the protrusion has a left and a right blocking end surfaces, a blocking pin is provided on the blocking rod, when the blocking rod is close to the roller shift fork, the outer circumferential surface of the blocking pin on the blocking rod is in contact with one of the blocking end surfaces on the roller shift fork such that the blocking rod is in contact with the roller shift fork, and when the blocking rod is far away from the roller shift fork under the actuation of the control cam, the blocking pin on the blocking rod is far away from the blocking end surface of the roller shift fork such that the blocking rod is out of contact with the roller shift fork.

Further, the blocking mechanism is provided with a blocking rod spring, the blocking rod spring is installed on the actuation cylinder, the blocking rod spring is in contact with the blocking rod and generates an acting force on the blocking rod, and the acting force of the blocking rod spring on the blocking rod maintains the one end of the blocking rod in contact with the control cam at all times.

Further, in the segment B where the first cam and the second cam on the camshaft both are in base circle parts thereof, a segment S where the rocker arm roller cannot be completely switched is existed, when the rocker arm roller starts to move in the segment S under an action of the actuation mechanism, the rocker arm roller cannot be completely switched from the first operating position to the second operating position or completely returned from the second operating position to the first operating position at the end point of the segment B, a switching prohibited portion is provided in a circumferential direction of the first cam and the second cam, and the switching prohibited portion at least includes the segment S where the rocker arm roller cannot be completely switched.

The control cam has the following relationship with the first cam and the second cam: when the rocker arm roller is in the switching prohibited portion of the first cam and the second cam, the control cam actuates the blocking rod and brings the blocking rod into contact with the roller shift fork, and when the rocker arm roller is in the non-switching prohibited portion of the first cam and the second cam, the control cam actuates the blocking rod and brings the blocking rod out of contact with the roller shift fork.

Further, a circlip is installed on the blocking rod shaft, and the circlip fixes the position of the blocking rod so that the blocking rod cannot move axially.

Further, a cylinder spring is installed on the actuation cylinder of the actuation mechanism, an air inlet of the actuation cylinder is in communication with compressed air of a vehicle, and the actuating piston of the actuation cylinder is pushed out by the compressed air of the vehicle and is actuated back by the cylinder spring.

Further, during the switching of the rocker arm roller, the end surface of the blocking pin on the blocking rod which is in contact with the roller shift fork is a spherical surface.

The present application has the following beneficial effects. Compared with the prior art, the variable valve actuation device for the engine provided by the present application equips each actuation cylinder with the control cam and the blocking mechanism. The control cam actuates the blocking mechanism to block the rocker arm roller from switching in the region where the rocker arm roller is not allowed to start to switch. The control cam actuates the blocking mechanism to no longer block the roller from switching in the region where the rocker arm roller is allowed to start to switch, so that the rocker arm roller can be free to switch. Thereby, the following can be ensured structurally: the angle position of the cam when the rocker arm roller starts to switch can only be in the allowed region, the position of the rocker arm roller when the rocker arm roller starts to switch is no longer influenced by the response time, and the ECU is not required to control the energization and deenergization time of the solenoid valve according to the camshaft position signal and the engine speed. The present application completely controls the position of the rocker arm roller when the rocker arm roller starts to act from a mechanical structure perspective, making the control of the position of the rocker arm roller when the rocker arm roller starts to switch very simple, which ensures the consistency and reliability of products.

BRIEF DESCRIPTION OF THE DRAWINGS

The drawings are used to provide a better understanding of the present application, and are used with the following specific embodiments to describe and explain the present application, but do not constitute a limitation of the present application. In the drawings.

DETAILED DESCRIPTION OF THE EMBODIMENTS

The specific technical solutions employed in the present embodiments are clearly and completely described below with reference to the drawings. In the description of the present application, unless otherwise specified, "plurality" means two or more, and the orientation or positional relationship indicated by terms such as "on", "under", "front", "back", "left", "right" used herein are only for the convenience of description and explanation of the present application based on the orientation or positional relationship shown in the drawings of the present application. The orientation or positional relationship shown in the figures should not be understood as a particular orientation or positional relationship that the referred device or element must have, and does not constitute a limitation of the present application.

Special note: in the drawings of the present specification, the shapes and relative positions of the first cam, the second cam and the control cam on the camshaft are only schematic diagrams, are only for explaining how the blocking mechanism of the present application can stop the rocker arm roller from moving and allow the rocker arm roller to move, and have certain randomness so that do not represent the shapes and relative positions of the actual cams, so the shapes and positions of the cams should be designed according to specific requirements in practice.

Figure 2:
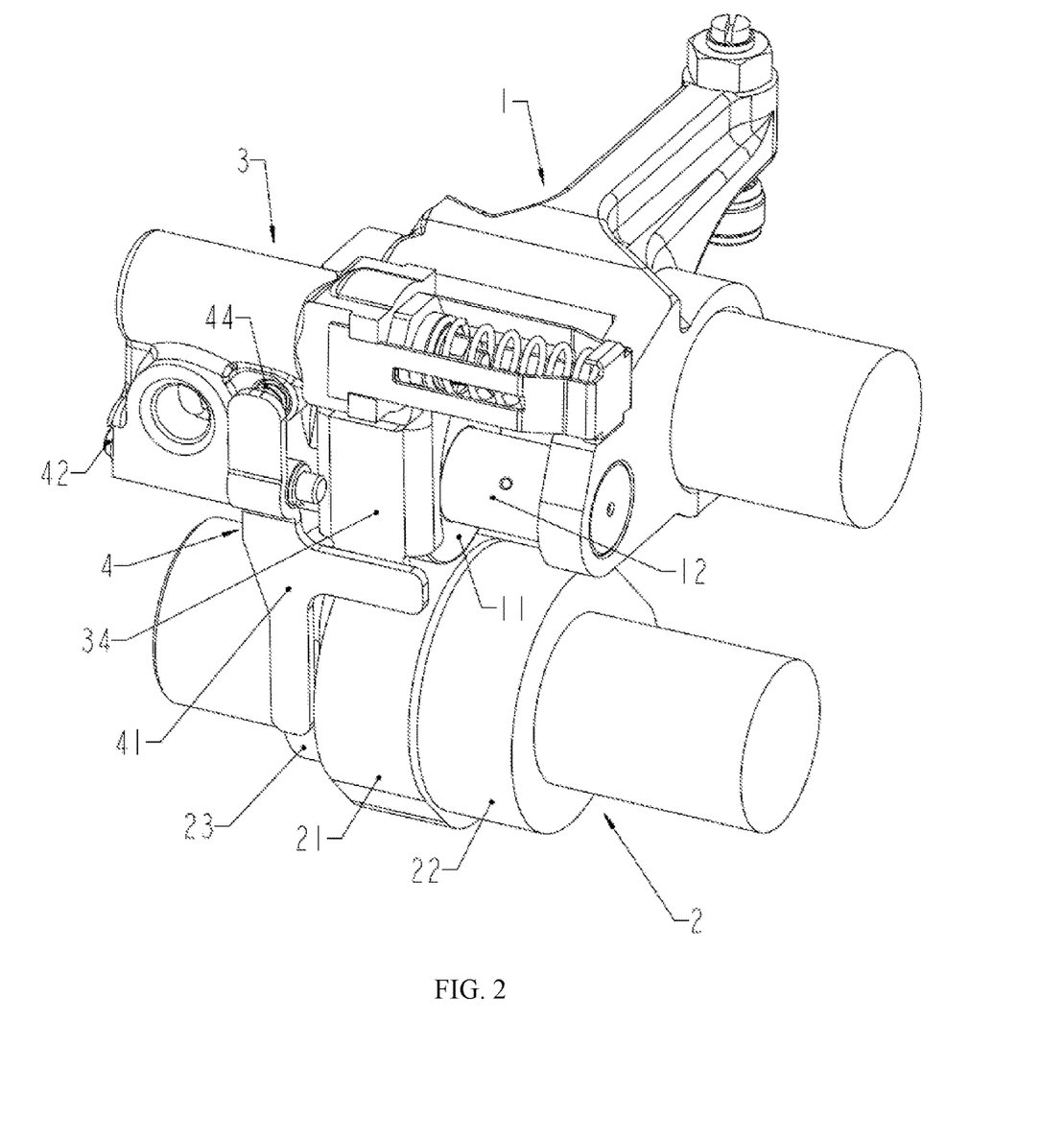
FIG. 2 is an overall structural schematic diagram of the variable valve actuation device for an engine of the present application.

FIG. 2 shows an overall structural schematic diagram of a variable valve actuation device for an engine of the present application, which includes a rocker arm mechanism 1, a camshaft 2, an actuation mechanism 3, and a blocking mechanism 4. The rocker arm mechanism 1 is provided with a rocker arm roller 11, the rocker arm roller 11 is rotatably installed on a roller shaft 12, the rocker arm mechanism 1 is provided with a widened roller mounting space, and the rocker arm roller 11 can slide left and right on the roller shaft 12 to enable the rocker arm roller to have a first operating position and a second operating position. The camshaft 2 is positioned below the rocker arm roller 11, a cam on the camshaft 2 is in contact with the rocker arm roller 11, and the rocker arm mechanism 1 is directly actuated by the camshaft 2 to open or close the valve.

Figure 3:
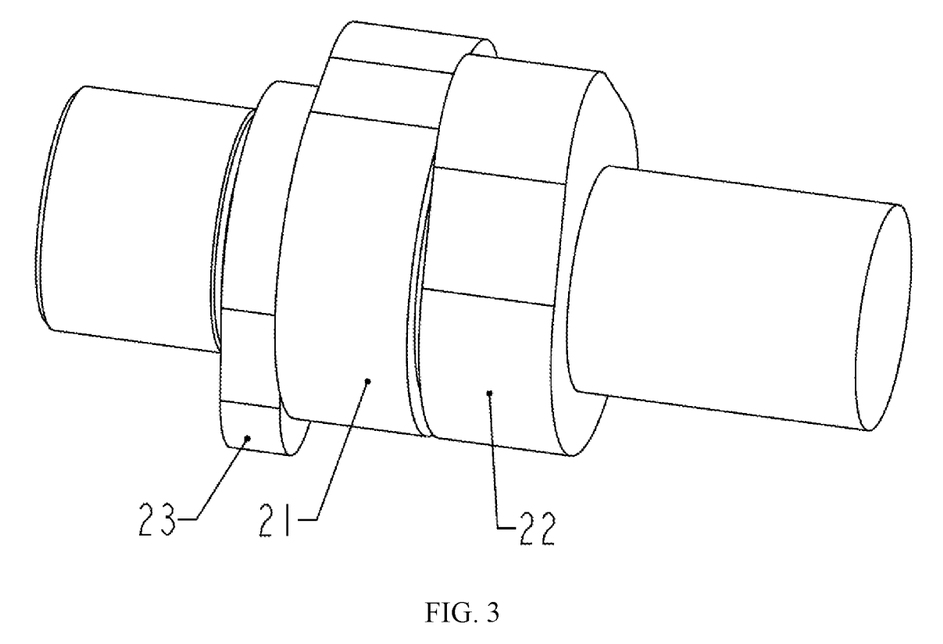
FIG. 3 is a structural schematic diagram of the camshaft of the variable valve actuation device for the engine of the present application.

FIG. 3 shows a structural schematic diagram of the camshaft 2 of the variable valve actuation device for the engine of the present application, where a first cam 21 and a second cam 22 which are adjacent are provided on the camshaft 2, a position of the first cam 21 corresponds to the first operating position of the rocker arm roller 11, a position of the second cam 22 corresponds to the second operating position of the rocker arm roller 11 (as shown in FIG. 2), the rocker arm mechanism 1 is actuated, based on the different operating positions of the rocker arm roller 11, by the first cam 21 or the second cam 22, respectively, to enable the engine to have two valve lifts, the first cam 21 and the second cam 22 have a same diameter in base circle parts thereof and have a segment B in a circumferential direction where the two cams both are in base circle parts thereof (see FIG. 4), and a control cam 23 is further provided on one side of the first cam 21 or the second cam 22.

Figure 5:
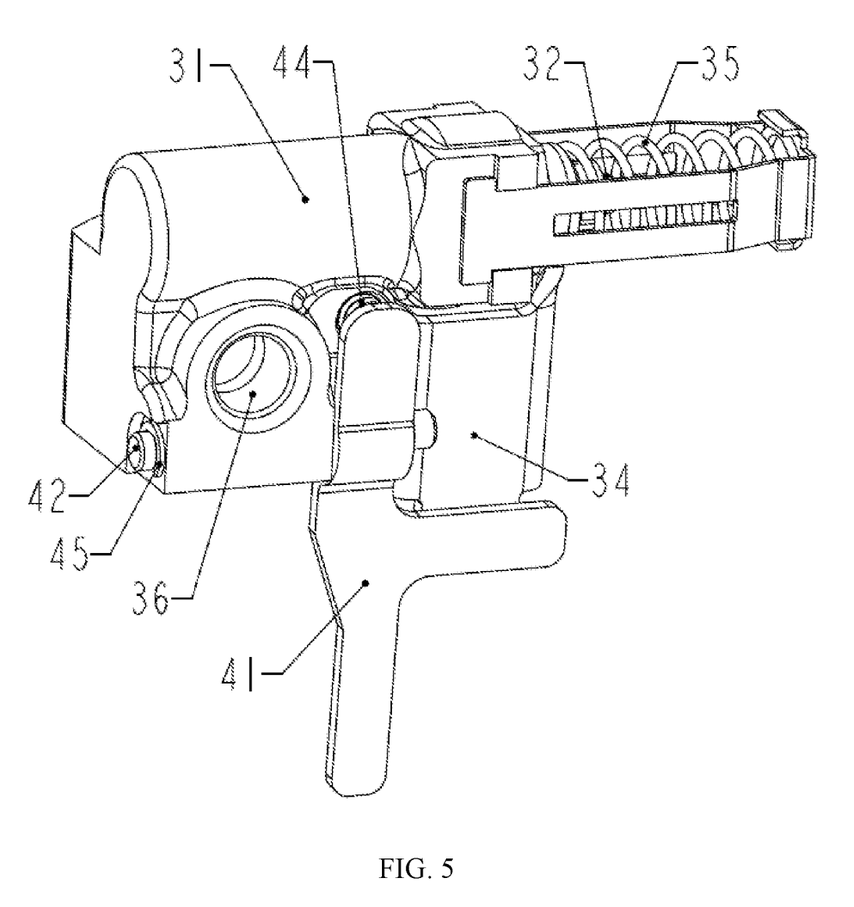
FIG. 5 is a structural schematic diagram where the actuation mechanism and a blocking mechanism of the variable valve actuation device for the engine of the present application are assembled together.
Figure 6:
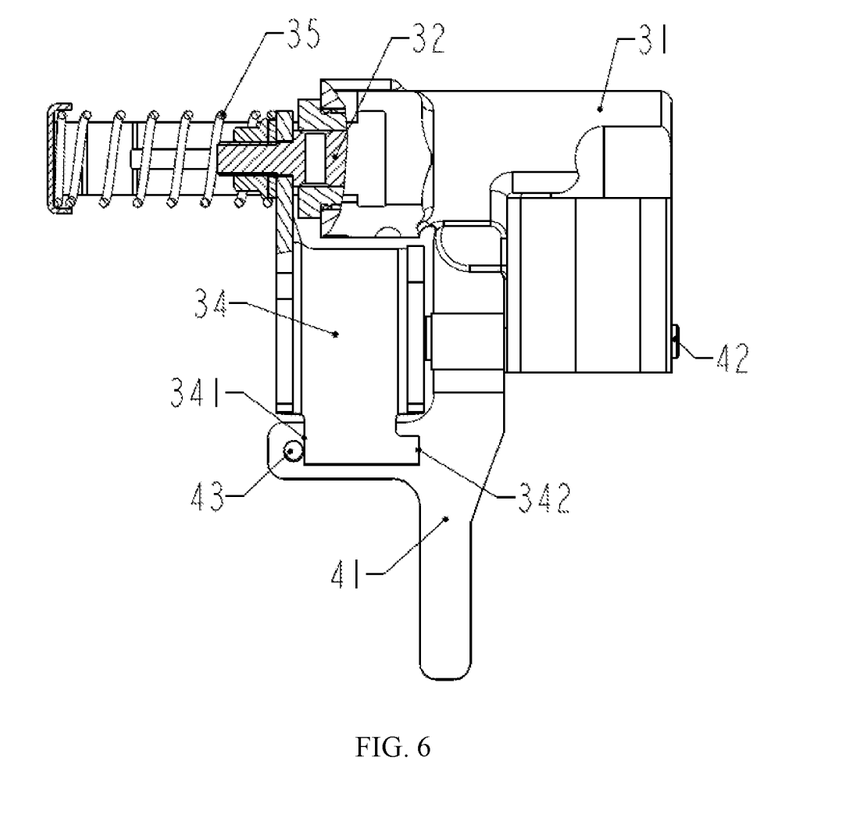
FIG. 6 is a partial sectional view of the actuation mechanism and the blocking mechanism of the variable valve actuation device for the engine of the present application taken along the center of the actuation cylinder.

FIG. 5 and FIG. 6 show structural schematic diagrams where the actuation mechanism 3 and the blocking mechanism 4 of the variable valve actuation device for the engine of the present application are assembled together. The actuation mechanism 3 includes a actuation cylinder 31, the actuation cylinder 31 is a small cylinder actuated by compressed air, a actuating piston 32 is installed in a cylinder hole of the actuation cylinder 31, a roller shift fork 34 is installed on a piston rod of the actuating piston 32, the rocker arm roller 11 is held by the roller shift fork 34 (as shown in FIG. 2), a cylinder spring 35 is installed on the actuation cylinder 31, an air inlet 36 of the actuation cylinder 31 is in communication with compressed air of a vehicle, the actuating piston 32 of the actuation cylinder 31 is pushed out by the compressed air of the vehicle and is actuated back by the cylinder spring 35, and the actuation cylinder 31 actuates the rocker arm roller 11 to switch between the first operating position and the second operating position through the roller shift fork 34 installed on the piston rod.

Figure 7:
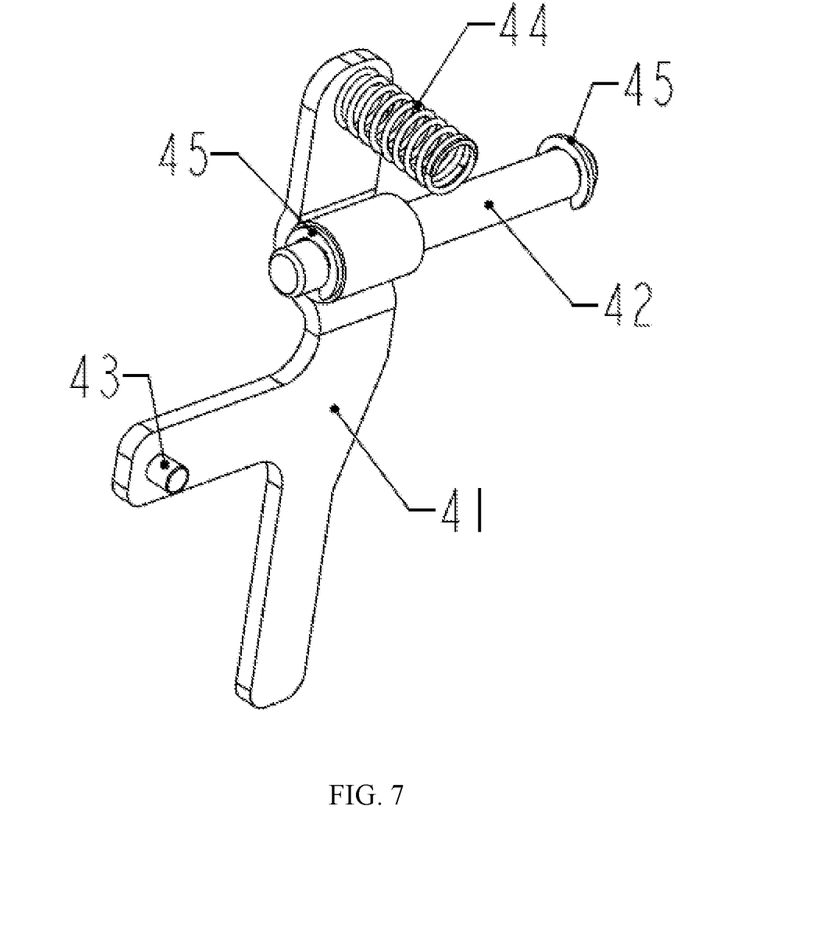
FIG. 7 is a structural schematic diagram of the blocking mechanism of the variable valve actuation device for the engine of the present application.

FIG. 7 shows a structural schematic diagram of the blocking mechanism 4 of the variable valve actuation device for the engine of the present application, where the blocking mechanism 4 includes a blocking rod 41 and a blocking rod shaft 42, the blocking rod shaft 42 is installed on the actuation cylinder 31 (see FIG. 5), the blocking rod 41 is a metal plate-shaped part with a shaft hole in the middle and having a shape of T, the blocking rod 41 is rotatably installed on the blocking rod shaft 42 through the middle shaft hole, a lower end of the blocking rod 41 is in contact with control cam 23 of the camshaft 2 (see FIG. 2) and is actuated by the control cam 23 to swing, and the blocking rod 41 is in contact with or out of contact with the roller shift fork 34 by the swing.

As shown in FIG. 5, FIG. 6 and FIG. 7, one end of the middle of the blocking rod 41 is positioned close to the roller shift fork 34, the lower end of the roller shift fork 34 is provided with one protrusion, surfaces at left and right sides of the protrusion are the two blocking end surfaces 341 and 342, a blocking pin 43 is provided on the end of the middle of the blocking rod 41, the blocking mechanism is further provided with a blocking rod spring 44, the blocking rod spring 44 is installed in a mounting hole on the actuation cylinder 31, the blocking rod spring 44 is in contact with the upper end of the blocking rod 41 and generates an acting force on the blocking rod, and the acting force of the blocking rod spring 44 on the blocking rod 41 maintains the lower end of the blocking rod in contact with the control cam 23 at all times.

Figure 8:
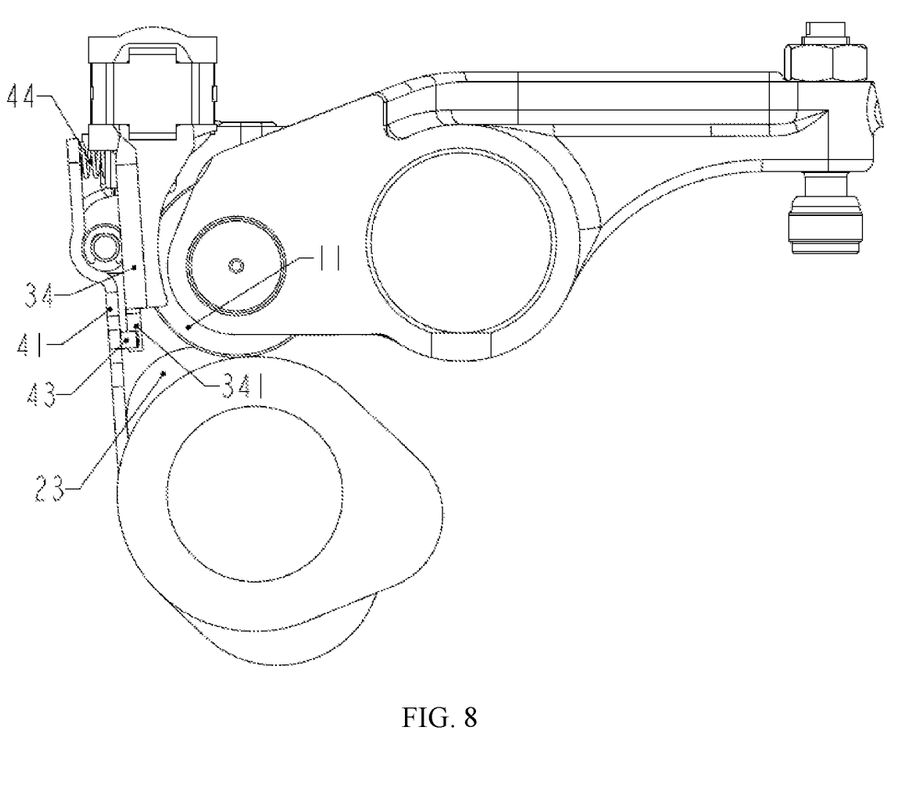
FIG. 8 is a structural schematic diagram where the rocker arm roller of the variable valve actuation device for the engine of the present application is blocked.
Figure 9:
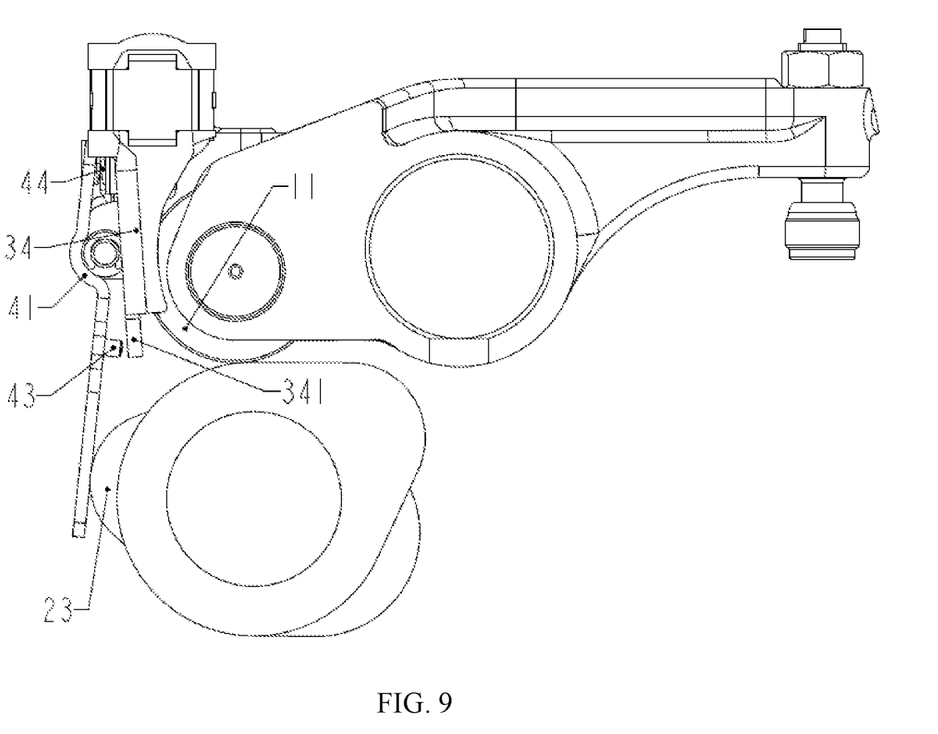
FIG. 9 is a structural schematic diagram where the rocker arm roller of the variable valve actuation device for the engine of the present application is not blocked.

FIG. 8 shows a structural schematic diagram where the rocker arm roller 11 of the variable valve actuation device for the engine of the present application is blocked. When the end of the middle of the blocking rod 41 is close to the roller shift fork 34, the outer circumferential surface of the blocking pin 43 on the blocking rod is in contact with the blocking end surface 341 on the roller shift fork 34 such that the blocking rod 41 is in contact with the roller shift fork 34. At this time, the blocking rod 41 blocks the movement of the roller shift fork 34. When the end of the middle of the blocking rod 41 is far away from the roller shift fork 34 under the actuation of the control cam 23, as shown in FIG. 9, the blocking pin 43 on the blocking rod is far away from the blocking end surface 341 on the roller shift fork 34 such that the blocking rod 41 is out of contact with the roller shift fork 34. At this time, the roller shift fork 34 can drive the rocker arm roller 11 to move under the action of the actuation cylinder 31.

Figure 10:
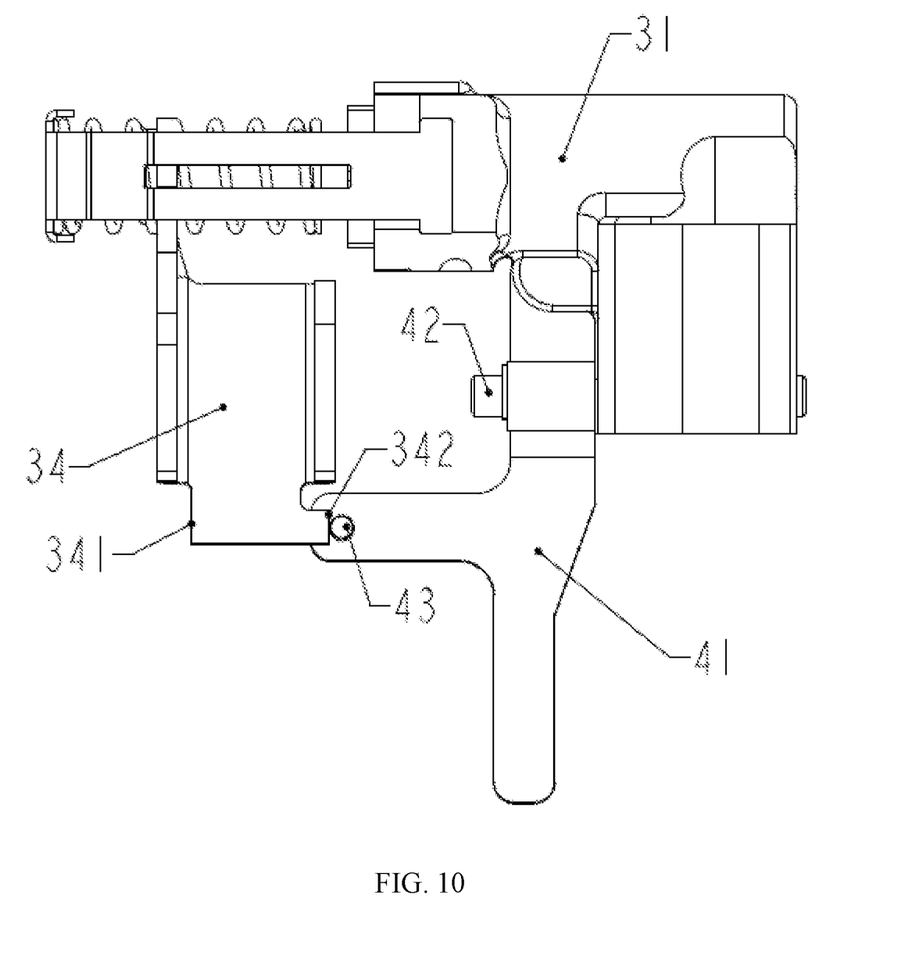
FIG. 10 is a structural schematic diagram where the rocker arm roller of the variable valve actuation device for the engine of the present application is blocked when it is at the second operating position.

FIG. 8 and FIG. 9 show schematic diagrams where the blocking rod 41 controls the rocker arm roller 11 to be movable or unmovable when the actuation cylinder keeps the rocker arm roller to be in the first operating position. Similarly, when the actuation cylinder switches the rocker arm roller 11 to the second operating position, as shown in FIG. 10 (for the convenience of viewing, the rocker arm mechanism and the camshaft not shown), the blocking rod 41 also controls the rocker arm roller 11 to be movable or unmovable, by making the blocking pin 43 be in contact with and out of contact with the blocking end surface 342 on the roller shift fork. The region where the rocker arm roller 11 is movable or unmovable is determined by the profile of the control cam 23.

Figure 4:
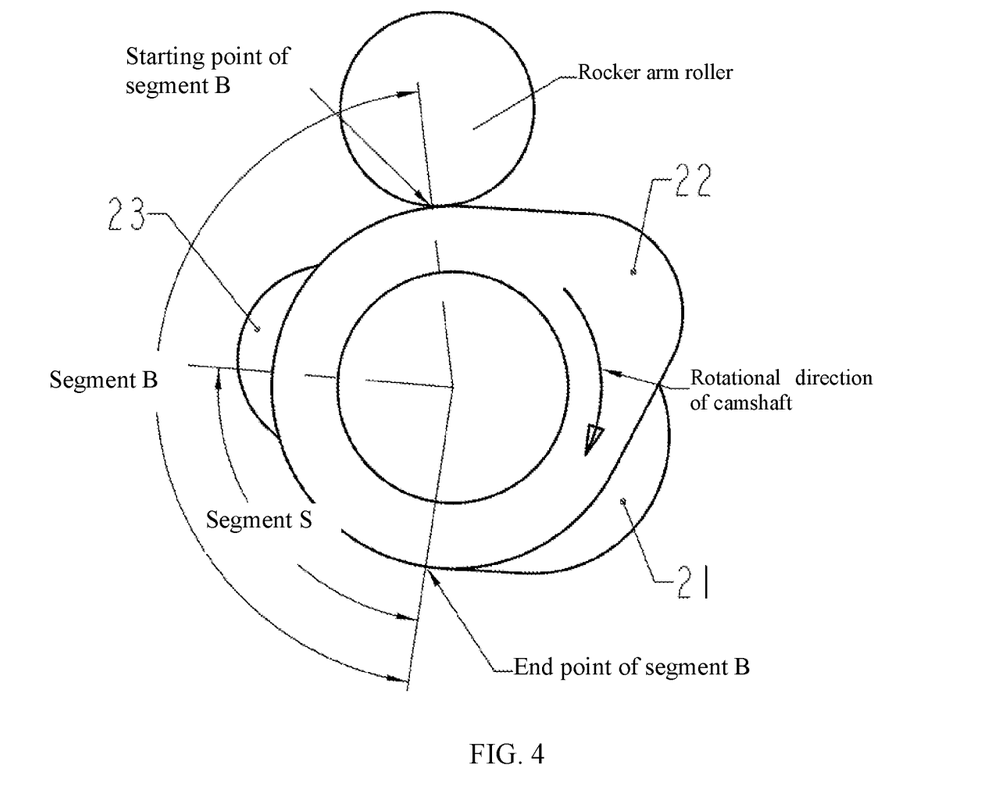
FIG. 4 is a schematic diagram of the segment B and the segment S where two cams on the camshaft of the variable valve actuation device for the engine of the present application both are in base circle parts thereof.

FIG. 4 shows a schematic diagram of a segment B and a segment S where two cams on the camshaft of the variable valve actuation device for the engine of the present application both are in base circle parts thereof. In the segment B where the first cam 21 and the second cam 22 on the camshaft 2 both are in base circle parts thereof, the segment S where the rocker arm roller 11 cannot be completely switched is existed. The segment S has the following features: at the highest rotational speed allowing the rocker arm roller to be switched, the time it takes for the camshaft to make the rocker arm roller pass through the segment S cannot meet the requirement of the switching time of the rocker arm roller, because a certain time is needed for switching the operating positions of the rocker arm roller, that is when the rocker arm roller starts to move in the segment S under the action of the actuation mechanism, the rocker arm roller cannot be completely switched from the first operating position to the second operating position or completely returned from the second operating position to the first operating position at the end point of the segment B. A switching prohibited portion is provided in a circumferential direction of the first cam 21 and the second cam 22, and the switching prohibited portion at least includes the segment S where the rocker arm roller cannot be completely switched, because the rocker arm roller cannot be completely switched to the other operating position when the rocker arm roller starts to move in the segment S. Of course, the other portion (e.g., a portion with lift) of the first cam 21 and the second cam 22 can be provided as the switching prohibited portion when the other portion needs the rocker arm roller to be prohibited from switching, and the range of the switching prohibited portion may be determined by the profile design of the control cam 23.

The control cam 23 has the following relationship with the first cam 21 and the second cam 22: when the rocker arm roller 11 is in the switching prohibited portion of the first cam 21 and the second cam 22, the control cam 23 actuates the blocking rod 41 and brings the blocking rod 41 into contact with the roller shift fork 34, and when the rocker arm roller 11 is in a non-switching prohibited portion of the first cam 21 and the second cam 22, the control cam 23 actuates the blocking rod 41 and brings the blocking rod 41 out of contact with the roller shift fork 34.

As can be known from the above, when the blocking rod blocks the roller shift fork from moving, the blocking rod will be subjected to an acting force from the roller shift fork, therefore, the circlip 45 is further installed on the blocking rod shaft, and the circlip 45 fixes the position of the blocking rod so that the blocking rod cannot move axially, as shown in FIG. 7.

The variable valve actuation device for the engine of the present application has the following operating process: during engine operation (for example, when the rocker arm roller 11 is at the first operating position), when it is needed to switch the rocker arm roller to the second operating position, the driver energizes the solenoid valve through a switch or under the control of the ECU for the engine to allow compressed air to enter the actuation cylinder 31; when the compressed air pressure overcomes the cylinder spring force, the actuation cylinder 31 pushes the rocker arm roller 11 through the roller shift fork 34 to start to switch; at this time, when the rocker arm roller 11 is in the switching prohibited portion of the first cam 21 and the second cam 22, the blocking rod 41 stops the rocker arm roller 11 from moving according to the design of the control cam 23 and the action of the blocking rod spring 44, as shown in FIG. 8, such that the rocker arm roller 11 cannot switch; and as the camshaft 2 rotates, the control cam 23 actuates the blocking rod 41 to be out of contact with the roller shift fork 34 when the camshaft rotates to the region where the rocker arm roller is in the non-switching prohibited portion, such that the rocker arm roller 11 is now free to switch to the second operating position, as shown in FIG. 9. Similarly, when it is needed to return the rocker arm roller 11 to the first operating position, the blocking rod also stops the rocker arm roller 11 from moving in the switching prohibited portion of the first cam 21 and the second cam 22, and the rocker arm roller can be free to return to the first operating position under the action of the cylinder spring force, only when the camshaft rotates to the region where the rocker arm roller is in the non-switching prohibited portion.

Figure 11:
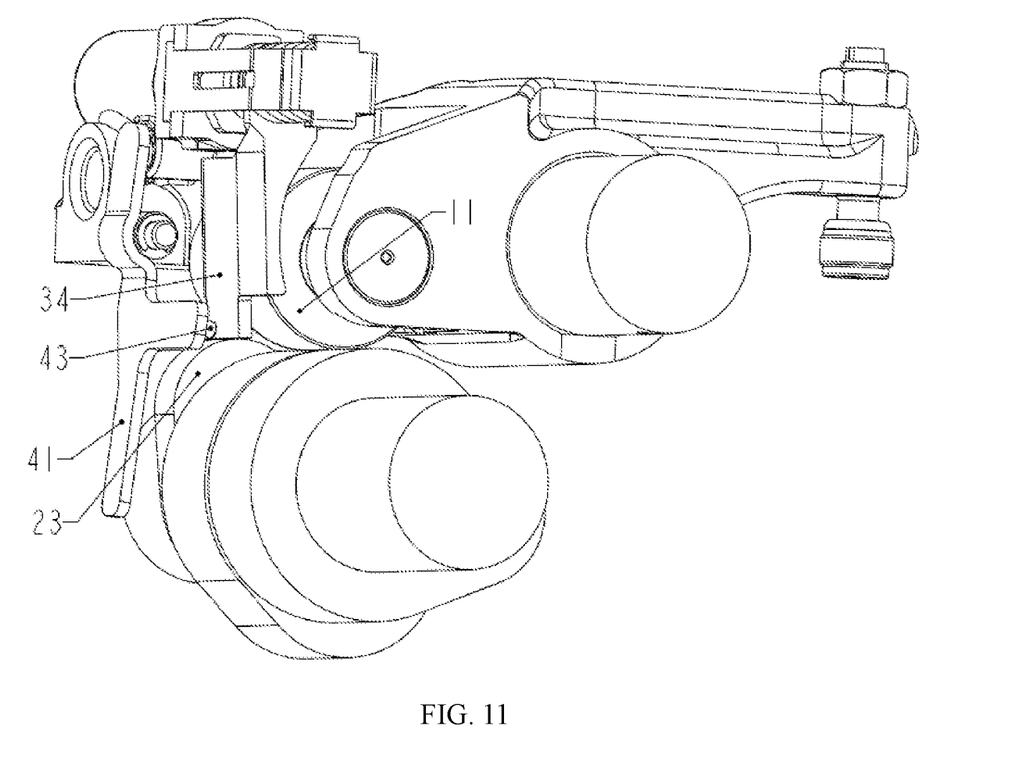
FIG. 11 is a schematic diagram where the blocking pin is in contact with a roller shift fork during the switching of the rocker arm roller of the variable valve actuation device for the engine of the present application.

Generally, the non-switching prohibited portion of the first cam 21 and the second cam 22 may be provided as a portion within segment B, where the two cams both are in base circle parts thereof, but not the segment S. Since the blocking mechanism needs to block the rocker arm roller from moving in the segment S, during the switching of the rocker arm roller, as shown in FIG. 11, and when the camshaft rotates to a point that the rocker arm roller enters the segment S, the end of the middle of the blocking rod approaches the roller shift fork 34 under the action of the blocking rod spring 44. At this time, the rocker arm roller is not completely switched to the other operating position, so that the end surface of the blocking pin 43 on the blocking rod 41 will be in contact with the protrusion of the roller shift fork 34. The blocking pin of the blocking rod 41 does not enter the blocking end surface in the other side of the roller shift fork to block the roller shift fork from moving until the rocker arm roller 11 is completely switched to the other operating position, as shown in FIG. 10. Because the spring force of the blocking rod spring is small, the contact between the blocking pin and the roller shift fork does not affect the switching of the roller in the switching process. The friction force between the blocking pin and the roller shift fork can be further reduced by designing the end surface of the blocking pin which is in contact with the roller shift fork as a spherical surface.

According to the above description, with the control cam and the blocking mechanism, the variable valve actuation device for the engine of the present application ensures that the rocker arm roller can only start to switch within an allowable range, and that the rocker arm roller can be blocked from switching in any region where it may causes switching failure. The present application guarantees the reliability of the rocker arm roller switching from a mechanical structure perspective, eliminates a need for software or other sensors to control the energization time of the solenoid valve, avoids the impact of the response time of the actuation mechanism and the solenoid valve or errors in the cam position signal on the timing of beginning of the rocker arm roller switching, and ensures the consistency and reliability of the operation of the mechanism.

It should be noted that, the above embodiments are only preferred embodiments adopted to illustrate the design and principle of the present application, and should not be understood as limitations of the present application. It will be apparent to those skilled in the art that the technical solutions described in the above embodiments may be further modified, or some technical features may be replaced, combined, etc. without departing from the concept of the present application. As examples, the structural form and the blocking way of the blocking rod may be different for different engine structures, and the blocking rod may also be designed as a tappet structure which is directly actuated by the control cam to reciprocate to control the movement of the rocker arm roller, which should be regarded as the protection scope of the present application.

What is claimed is:

1. A variable valve actuation device for an engine, the variable valve actuation device comprising:
   a camshaft including a first cam, a second cam, and a control cam;
   a rocker arm mechanism including:
      an extended roller shaft, and
      a rocker arm roller rotatably mounted to the roller shaft, the rocker arm roller configured to slide axially along the roller shaft so as to engage the first cam when in a first operating position, and engage the second cam when in a second operating position;
   an actuation mechanism associated with the rocker arm mechanism, the actuation mechanism including:
      a pneumatically-controlled actuation cylinder defining a cylinder hole,
      an actuating piston arranged in the cylinder hole, and
      a roller shift fork coupled to the actuating piston, the roller shift fork configured to axially flank the rocker arm roller so as to effectuate a switching of the rocker arm roller between the first and second operating positions when the actuation cylinder actuates the actuating piston; and
   a blocking mechanism coupled to the actuation mechanism, the blocking mechanism including:
      a blocking rod shaft mounted to the actuation cylinder, and
      a blocking rod pivotally mounted to the blocking rod shaft so as to engage the control cam, the control cam configured to cause the blocking rod to intermittently engage the roller shift fork such that (i) the switching of the rocker arm roller is prevented when the blocking rod is in contact with the roller shift fork, and (ii) the switching of the rocker arm roller is enabled when the blocking rod is out of contact with the roller shift fork.

2. The variable valve actuation device according to claim 1, wherein:
   the roller shift fork includes a first blocking end surface and a second blocking end surface, and the blocking rod includes a blocking pin such that the switching of the rocker arm roller is prevented when a cylindrical surface of the blocking pin is in contact with the first blocking end surface or the second blocking end surface.

3. The variable valve actuation device according to claim 2, wherein:
   the blocking pin includes a spherical end surface configured to engage the roller shift fork when the blocking rod is brought into contact with the roller shift fork during the switching of the rocker arm roller.

4. The variable valve actuation device according to claim 1, wherein:
   the blocking mechanism further includes a blocking rod spring pressed between the blocking rod and the actuation cylinder so as to maintain the blocking rod in contact with the control cam at all times.

5. The variable valve actuation device according to claim 1, wherein:
   the switching of the rocker arm roller is enabled when the rocker arm roller is within a switching portion corresponding to an angular range of the camshaft in which a base circle region of the first cam coincides with a base circle region of the second cam,
   the switching portion includes a switching prohibited portion corresponding to an angular range within the switching portion which is insufficient for the switching of the rocker arm roller to be initiated and completed before the rocker arm roller reaches an end of the switching portion, and
   the control cam is shaped such that (i) the blocking rod is moved out of contact with the roller shift fork when the rocker arm roller enters the switching portion, and (ii) the blocking rod is brought into contact with the roller shift fork when the rocker arm roller reaches the switching prohibited portion so as to prevent the switching of the rocker arm roller from being initiated within the switching prohibited portion.

6. The variable valve actuation device according to claim 1, wherein:

the blocking mechanism further includes a circlip mounted to the blocking rod shaft so as to prevent axial movement of the blocking rod along the blocking rod shaft.

7. The variable valve actuation device according to claim 1, wherein:
the actuation mechanism further includes a cylinder spring mounted to the actuation cylinder so as to bias the actuating piston into the cylinder hole, and
the actuation cylinder includes an air inlet configured to selectively convey compressed air into the cylinder hole so as to push the actuating piston out of the cylinder hole.

* * * * *